United States Patent [19]
Dancila et al.

[11] Patent Number: 6,136,406
[45] Date of Patent: Oct. 24, 2000

[54] ENERGY DISSIPATING COMPOSITE MEMBER WITH PROGRESSIVE FAILURE

[75] Inventors: D. Stefan Dancila, Smyrna; Erian A. Armanios, Marietta, both of Ga.

[73] Assignee: Georgia Tech Research Corp., Atlanta, Ga.

[21] Appl. No.: 09/067,465

[22] Filed: Apr. 28, 1998

Related U.S. Application Data

[60] Provisional application No. 60/045,503, May 2, 1997, abandoned.

[51] Int. Cl.[7] .......................................... B32B 5/00

[52] U.S. Cl. ............................ 428/98; 428/100; 428/102; 428/105; 428/108; 428/109; 428/112; 428/131; 428/133; 428/192; 428/193; 428/221

[58] Field of Search ............................. 428/98, 100, 102, 428/105, 108, 109, 112, 131, 133, 192, 193, 221

[56] References Cited

FOREIGN PATENT DOCUMENTS

WO 94/14607   7/1994   Germany .

*Primary Examiner*—Richard Weisberger
*Attorney, Agent, or Firm*—Thomas, Kayden, Horstemeyer & Risley

[57] ABSTRACT

A tailored structural member that is designed to generate a yield-type response, with applicability to the arrest of a moving body. The structural member comprises a primary load path connected in parallel to a longer secondary load path at a pair of common nodes. The primary load path is designed to fail at a lower load than that required to fail the secondary load path when subjected to a tensile force. As a result of the load redistribution achieved through the use of the redundant paths provided by the primary and secondary load paths, the structural member dissipates more kinetic energy from the moving body within a given set of displacement and deceleration force constraints than is possible using a conventional, uniform cross-section member.

16 Claims, 11 Drawing Sheets

ENERGY DISSIPATING COMPOSITE MEMBER WITH PROGRESSIVE FAILURE

CROSS REFERENCE TO RELATED APPLICATION

This application claims the benefit of U.S. Provisional Application No. 60/045,503, abandoned entitled "Energy Dissipating Composite Members With Progressive Failure," filed May 2, 1997, the disclosure of which is incorporated herein by reference.

BACKGROUND OF THE INVENTION

The present invention relates generally to tailoring of composite material structures, and more particularly to the tailoring for yield-type response in composite material members subject to tensile loading, with direct applicability to the arresting of moving bodies and the maximization of kinetic energy dissipation by an arresting member within a set of displacement and deceleration force constraints.

The problem of arresting a moving body with constraints imposed upon the values of maximum deceleration and maximum distance (or displacement) over which to perform the arrest is frequently encountered, particularly in the fields of aerospace and automotive engineering. Typical constraints stem from payload/passenger deceleration tolerance limits and/or distance available for the arrest.

Several solutions for this problem have been proposed, and some of them are well established. Fundamentally, existing solutions can be divided into two classes: arresting mechanisms and structural arresting devices.

The first class is represented by aircraft carrier cable arrest systems and inertial/centrifugal braking devices used in association with cables, mechanisms generally characterized by good reliability and performance. However, their complexity and their weight represent drawbacks and a limitation for their use.

The second class is represented by crushable subfloors, which are commonly used in aerospace designs, crumpling zones, which are commonly used in vehicle designs, or a bungee cord, which is used today primarily for recreation. While of comparatively reduced weight and complexity, the systems in this class are also capable of performing the function of decelerating/arresting a payload.

Composite materials are playing an increasing role in structural applications. These materials combine high specific strength and stiffness with a high degree of anisotropy, which makes them attractive candidates for use in many designs. A large volume of research addressing the subject of composite materials has established their usefulness for structural applications.

One important problem that occurs when structural solutions are employed for constrained arrest of a moving body stems from the rapid increase in arresting force that is developed as a function of the structural deformation. Consider, for example, the operation of a bungee cord. The arresting force starts from zero when the chord is just taut and continuously increases with the amount of stretching applied thereby subjecting the payload to a proportionately increasing deceleration. Consequently, the constraint on the maximum level of deceleration admissible may be violated. This effect is even more significant in the case of structures characterized by a higher stiffness, such as a fuselage or a subfloor. Solutions incorporating crushable subfloors attempt to alleviate this problem by designing a structure with a flatter arresting force versus displacement response. However, because a subfloor has an arresting displacement capability that is limited to a value generally on the order of the floor thickness, this flat response translates into limited energy dissipation. On the other hand, a structure that is too compliant will either exceed the displacement constraint or exceed the maximum strain level accepted by the material of the structure and fail without having dissipated the necessary amount of energy.

Accordingly, what is sought is a structural member for arresting a payload that maximizes the amount of energy dissipated within a set of constraint values for both maximum deceleration force and distance over which the arrest is performed.

SUMMARY OF THE INVENTION

Certain objects, advantages and novel features of the invention will be set forth in the description that follows and will become apparent to those skilled in the art upon examination of the following or may be learned with the practice of the invention.

The present invention is generally directed to the tailoring of a structural member to produce a yield-type response under tensile loading and method of use the structural member for arresting a moving body under constraints on deceleration level and arrest distance. Broadly stated, the structural member comprises a primary load path connected in parallel with a longer secondary load path at one or more common intermediate nodes or connectors. The primary load path is designed to fail at a lower load level than that required to fail the secondary load path when subjected to a tensile force. As a result of the load redistribution achieved through the use of the primary and secondary redundant load paths, the structural member dissipates more kinetic energy from the moving body within a given set of displacement and deceleration force constraints than is possible using a conventional, uniform cross-section structural member.

According to an aspect of the invention, the structural member comprises a plurality of links, where each link comprises a primary and secondary segment pair as discussed above. In that configuration, the structural member dissipates kinetic energy through a progressive, sequential failure of the primary segments while retaining the overall structural integrity of the member until failure of one of the secondary segment after all primary segments have failed. Advantageously, for a given length structural member, energy dissipation increases as the number of links increases.

Preferably, the primary and secondary segments comprise unidirectional composite fibers embedded in an elastomeric matrix. Such an embodiment allows the structural member to retain substantial lateral flexibility while remaining axially stiff. Because of their high specific strength and stiffness, PBO fibers, KEVLAR® fibers, carbon fibers, and glass fibers are good candidates for use in the primary and secondary segments.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

Figure 1:
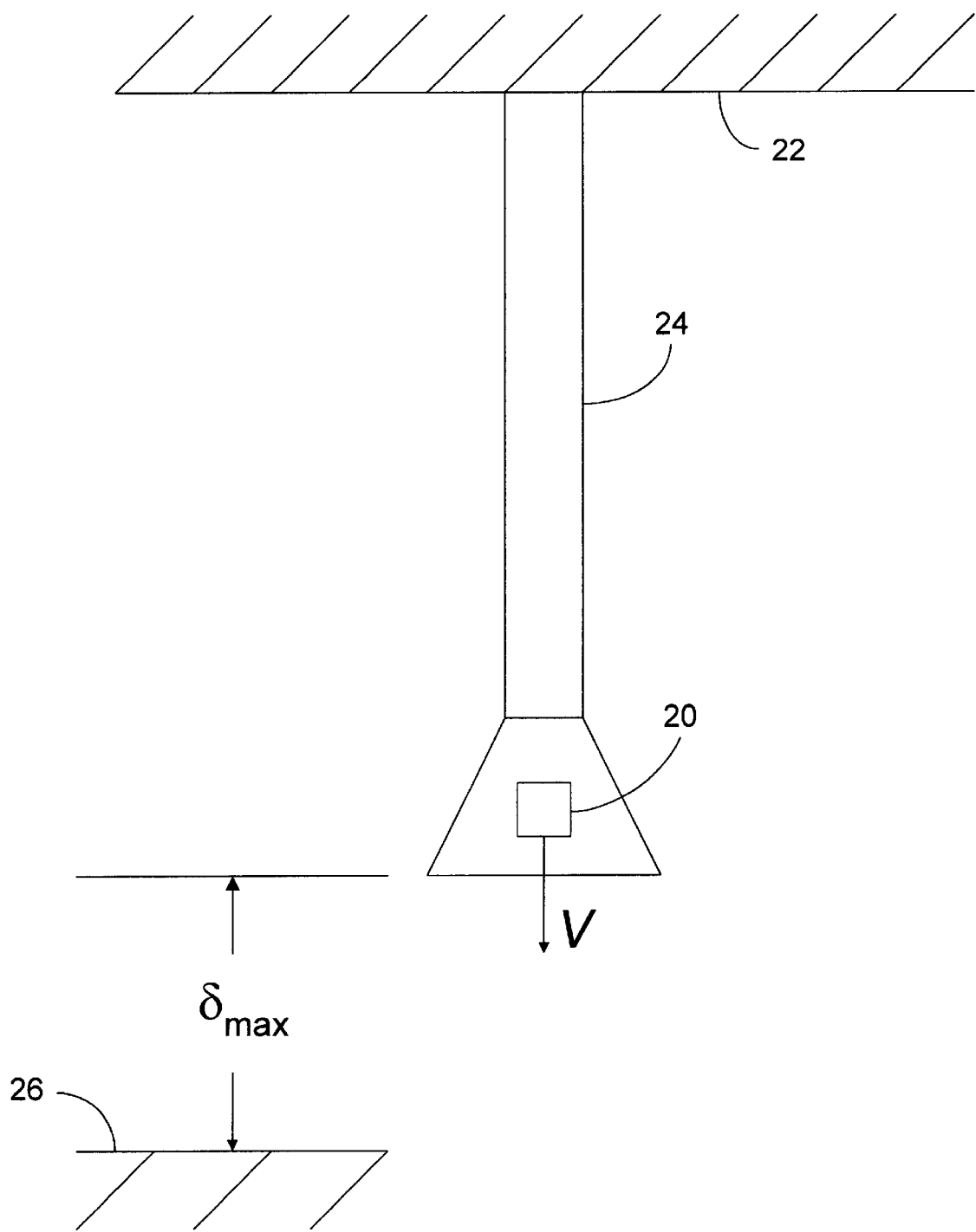
FIG. 1 is a diagram of a moving body under arrest by a structural member.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

The general problem of arresting a moving body is illustrated in FIG. 1. Moving body 20 is connected to support base 22 by structural member 24. Body 20 is characterized by a mass m and a velocity V.

The goal for structural member 24 can thus be stated as follows: to arrest the movement of body 20 within a maximum available distance (or displacement), denoted by $\delta_{max}$, and without exceeding a maximum deceleration level, denoted by $\alpha_{max}$. The deceleration limit level, $\alpha_{max}$, can be regarded as connected to physiological human tolerance limits, while the maximum distance available, $\delta_{max}$, is related to the travel space available before body 20 makes contact with a limiting element 26.

For the case of uniform deceleration, the velocity, deceleration and distance are related as set forth in Equation 1:

$$V_F^2 = V_I^2 + 2\alpha\delta \quad (1)$$

$V_F$=final velocity $V_I$=initial velocity

A successful arrest results in $V_F$ having a value of zero; therefore, when the above constraints are applied to Equation 1, a simple feasibility condition is derived and expressed as Equation 2:

$$V_I \leq \sqrt{2\alpha_{max}\delta_{max}} \quad (2)$$

Thus, within these deceleration and distance constraints, body 20 can be successfully arrested if its velocity does not exceed the upper limit given by Equation 2.

Keeping in mind the constraints developed in the foregoing discussion, the characteristics and design of structural member 24 will now be reviewed.

Referring again to FIG. 1, assume structural member 24 is elastic and therefore elongates as body 20 moves towards limiting element 26. In the process of being stretched, structural member 24 applies a restraint force to body 20 and converts kinetic energy from body 20 into strain energy. At the point where body 20 reaches zero velocity, all of the kinetic energy from body 20 has been converted into strain energy in structural member 24. Ideally, the strain energy in structural member 24 would then be converted back into kinetic energy such that body 20 is propelled in the opposite direction with the same velocity V.

If, however, structural member 24 fails under the force of body 20, the kinetic energy that had been converted into strain energy is released by the failure and causes a corresponding reduction in the kinetic energy of body 20. Preferably, the failure of structural member 24 occurs at the point where body 20 has zero velocity (i.e., all kinetic has been converted into strain energy), which would result in a full arrest.

Figure 2:
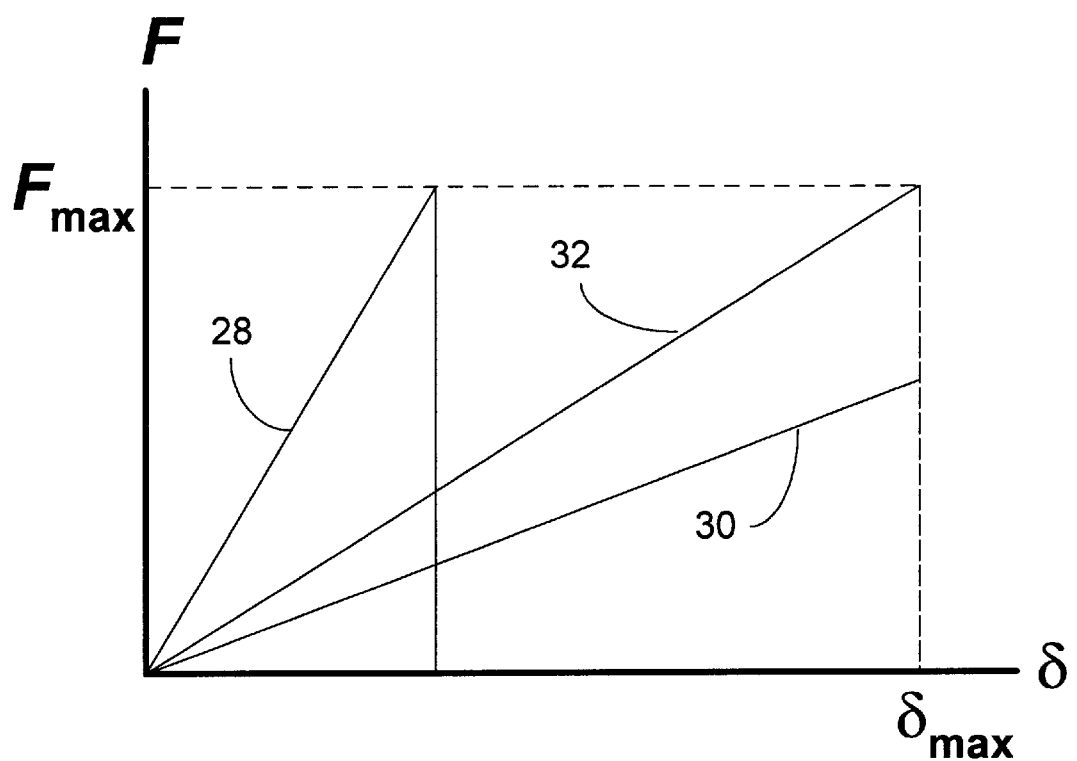
FIG. 2 is a graph depicting the deceleration force and distance constraints for the FIG. 1 scenario.

FIG. 2 provides a graphical illustration of the kinetic energy to be converted by structural member 24. The system is bounded by a distance constraint, $\delta_{max}$, and a deceleration constraint, $\alpha_{max}$. The maximum force $F_{max}$ that can be applied to effect the arrest of body 20 is given by Equation 3:

$$F_{max} = m\,\alpha_{max} \quad (3)$$

Accordingly, the maximum kinetic energy that can be dissipated while remaining within the constraint boundaries is set forth in Equation 4:

$$KE = F_{max}\,\delta_{max} \quad (4)$$

The graph in FIG. 2 contains curves representing three types of composite structural members demonstrating a linear response for deceleration force applied versus distance traveled. Curve 28 represents a stiff structural member in which the maximum deceleration constraint is met before exceeding the maximum distance. Similarly, curve 30 represents a compliant structural member in which the distance constraint is met first. Curve 32 corresponds to the case where both constraints are met simultaneously. Of these three examples, it is clear that the case represented by curve 32 converts the most kinetic energy into strain energy; however, this performance is far from ideal as only 50% of the energy that could be converted while remaining within the constraints is converted.

Composite materials comprising a bundle of long fibers held in an epoxy matrix can be used for structural member 24 and exhibit the linear, brittle behavior of curve 28. A better candidate for structural member 24 would be a material that exhibits the non-linear response depicted in FIG. 3 as curve 34. As the graph shows, the improved member is significantly more efficient in converting kinetic energy into strain energy while staying within the imposed constraints.

Figure 3:
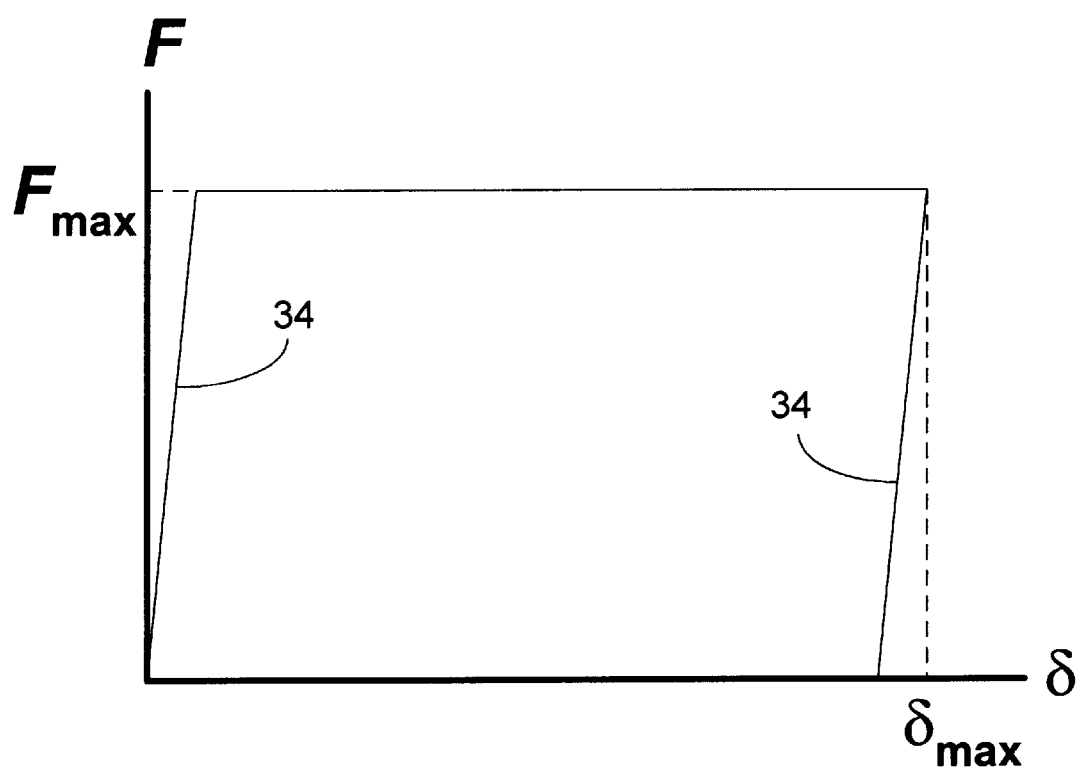
FIG. 3 is a graph of an improved deceleration force versus distance response for the structural member of FIG. 1 while complying with the constraints of FIG. 2.

The present invention therefore seeks to provide a composite structural member 24 having a force versus distance response that covers, to the greatest extent possible, the area under the constraints in FIG. 3.

Consider first a structural member 24 comprising a bundle of unidirectional fibers. The force versus distance curve for a single fiber is generally linear until the point of failure (i.e., the curve can be represented by a ramp function) at which time the force abruptly drops to zero. If several fibers of equal length and identical physical characteristics are bundled together to form a single structural member 24, the force versus distance curve would retain the same form as that illustrated in FIG. 2, with the only difference in the magnitude of the force exerted before all the fibers failed simultaneously. Alternatively, consider a structural member embodiment comprising a bundle of fibers tailored such that they have a uniform length distribution over a specified length interval. This will result in an offset between points on the distance axis where the individual fibers come under load.

Figure 4:
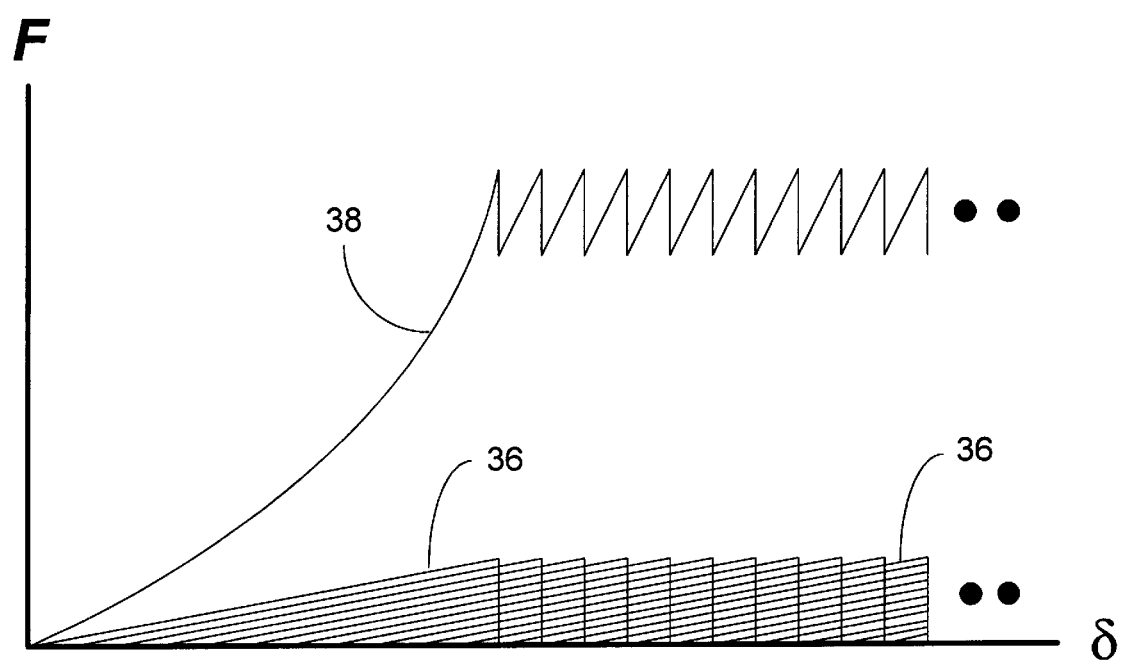
FIG. 4 is a graph of the deceleration force versus distance response of the structural member of FIG. 1 implemented as a bundle of tailored-length fibers.

The force versus distance response curves for the tailored length fiber bundle configuration is shown in FIG. 4. Lower curves 36 correspond to the individual fibers while upper curve 38 represents the overall performance of structural member 24, which is a summation of curves 36. It is apparent that if the length difference between the fibers is large enough, the failure of the shortest fiber occurs before the longer fibers start carrying load. It is apparent that the response of the tailored length, bundled fiber design, denoted by curve 38, begins to resemble the desirable response shown in FIG. 3.

This solution is not practical, however, because fibers need to be embedded in a protective matrix to shield them from environmental factors. Unfortunately, use of an epoxy, rigid resin matrix (e.g., thermoplastic or thermoset) inhibits the desired response of FIG. 4 because all fibers are loaded simultaneously. If an epoxy, brittle matrix is used to bind the fibers together, failure of a relatively small number of fibers generates a critical condition that triggers the premature failure of the entire bundle or member at that cross section.

One solution to this problem is to replace the brittle, epoxy resin with an elastomeric material having a smaller elastic modulus, a larger failure strain and increased fracture toughness. The elastomeric matrix preserves the axial tensile stiffness and strength characteristics of the composite material, given by the embedded fibers, while providing a certain amount of bending compliance due to the reduced matrix elastic modulus compared to the brittle, epoxy matrices. This bending compliance is an important factor in the operability of the composite member to be discussed hereafter. Rubber compounds are representative candidates for use as an elastomeric matrix.

Thus, the preferred composite member for use in the present invention comprises a plurality of unidirectional fibers aligned parallel to one another and embedded in an elastomeric matrix. Fibers are preferred as one component of the composite member because of their beneficial structural properties. It is well known that materials in fiber form have better strength and stiffness when compared to the same material in bulk form. This is a result of the arrangement of the atoms and molecules that takes place at a microscopic level during manufacturing, which allows the fiber-form material to contain fewer structural defects when compared to its bulk counterpart. Preferably, PBO, KEVLAR, carbon or glass fibers are used because of their high mechanical properties and low weight.

Nevertheless, while composite fibers are the preferred material for practicing the principles of the present invention taught herein, the invention can be practiced with success using alternative materials examples of which include, but are not limited to wire, rope, thread, cables, or chains.

Figure 5:
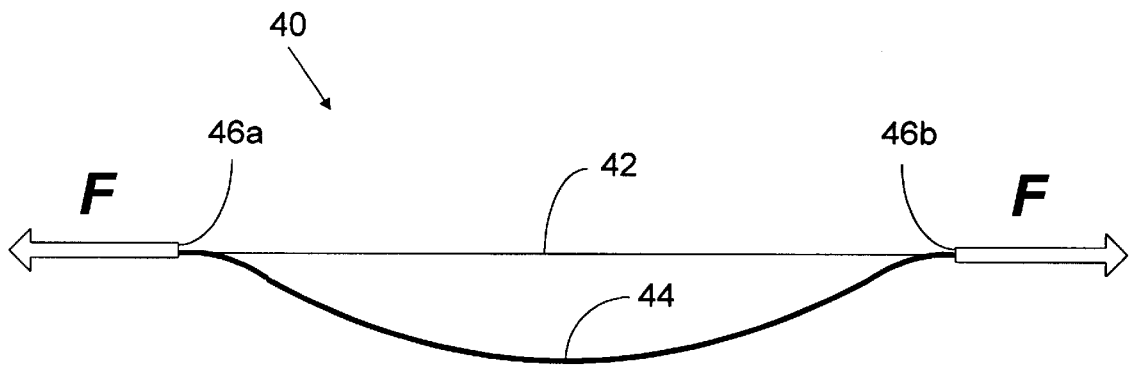
FIG. 5 is a diagram of a single-link composite embodiment of the structural member of FIG. 1.

Referring now to FIG. 5, an assembly 40 is shown comprising two segments 42 and 44 connected at two end nodes or connectors 46a and 46b. Assembly 40 will be referred to herein as single-link, composite member 40 as it will be a fundamental building block for constructing composite structural members that embody the principles of the present invention. Segments 42 and 44 each comprise long, continuous, unidirectional fibers embedded into an elastomeric matrix. At the nodes or connectors 46a and 46b, the fibers of the two links run parallel to each other and are embedded in a common matrix. Segment 42, which is denoted the primary segment, is shorter than segment 44, which is denoted the secondary segment. Each segment has a length l and a cross sectional area A. The relationship between the physical characteristics of the two segments is given by Equation 5 where the subscript p identifies primary segment 42 quantities while the subscript s identifies secondary segment 44 quantities.

$$l_p < l_s$$

$$A_p < A_s \tag{5}$$

Without being a necessary condition in general, for the purpose of clarity the minimum length difference between the two segments is assumed to follow the expression set forth in Equation 6:

$$(l_s - l_p) > 2 l_p \epsilon_{fu} \tag{6}$$

The quantity $\epsilon_{fu}$ represents the ultimate strain of the fibers and can be used to compute the elongation of a segment at failure. Simply stated, Equation 6 can be read as requiring the difference in length between the segments to be greater than twice the elongation of the primary segment at failure. As discussed in the foregoing, the elastomeric matrix provides link 40 with generally compliant bending properties while maintaining the axial tensile stiffness of the embedded fibers.

Figure 6:
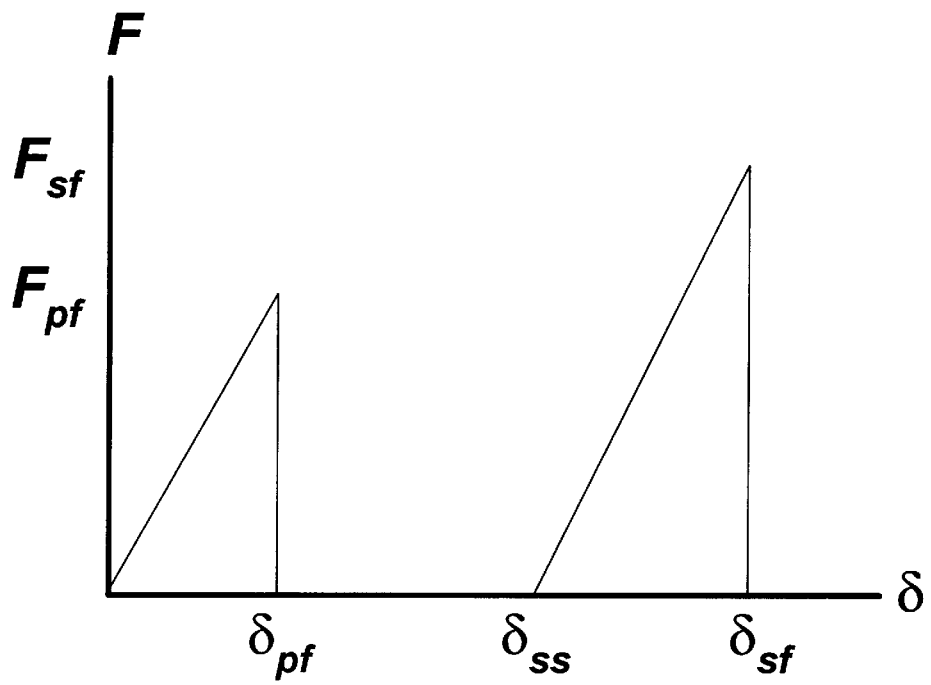
FIG. 6 is a graph of the deceleration force versus distance response of the single-link composite member of FIG. 5.

FIG. 6 illustrates the force versus distance response when an axial stretching force is applied to nodes 46a and 46b of link 40. Due to the assumed difference in length between the two segments and their bending flexibility, primary segment 42 will initially come under load with secondary segment 44 remaining unstressed. This corresponds to the first peak in the graph of FIG. 6. Primary segment 42 follows the same linear response discussed hereinbefore up to the point of failure. The displacement of primary segment 42 at failure is given by Equation 7:

$$\delta_{pf} = l_p \epsilon_{fu} \tag{7}$$

The deceleration force imposed by primary segment 42 at failure is given by Equation 8 where $E_f$ is the fiber elastic modulus.

$$F_{pf} = A_p E_f \epsilon_{fu} \tag{8}$$

Secondary segment 44 will remain unloaded until a displacement of $\delta_{ss} = (l_s - l_p)$ is reached. At that point, secondary segment 44 follows the usual response profile until reaching its failure displacement set forth in Equation 9:

$$\delta_{sp} = (l_s - l_p) + l_s \epsilon_f^u \tag{9}$$

The deceleration force imposed by secondary segment 44 at failure is given by Equation 10 where $F_f$ is the fiber elastic modulus.

$$F_{sf} = A_s E_f \epsilon_f^u \tag{10}$$

Because of the assumptions in Equation 5, specifically $A_p < A_s$, it follows that $F_{sf} > F_{pf}$.

The energy dissipated by link 40 through its complete failure is given by the area under the triangles of FIG. 6. A brief comparison of the single link response of FIG. 6 with the desirable response of FIG. 3 shows that the response should be improved between $\delta_{pf}$ and $\delta_{ss}$.

Figure 7A:
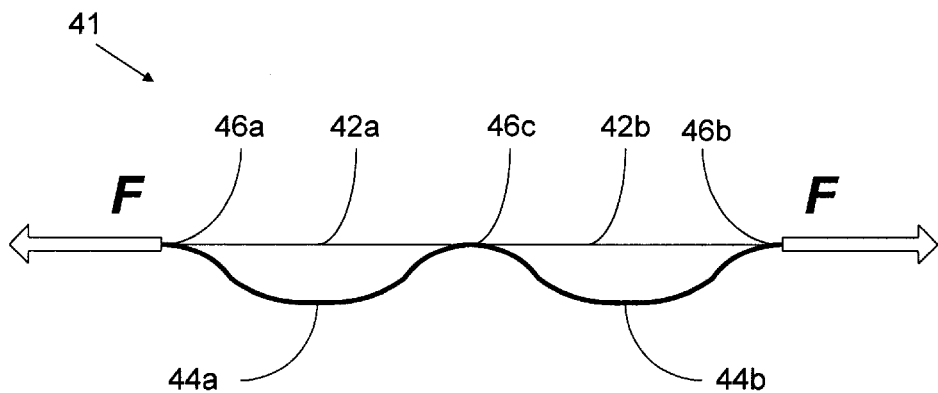
FIG. 7A is a diagram of a two-link composite member constructed from the single link member of FIG. 5.

Consider now the composite structural member 41 of FIG. 7A, which is constructed by adding a third node to link 40 of FIG. 5 to form a two-link system such that primary links 42a and 42b have lengths of $l_p/2$ and secondary links 44a and 44b have lengths of $l_s/2$. The force versus distance response for the two-link, composite member 24 of FIG. 7A is shown in FIG. 8.

Figure 7B:
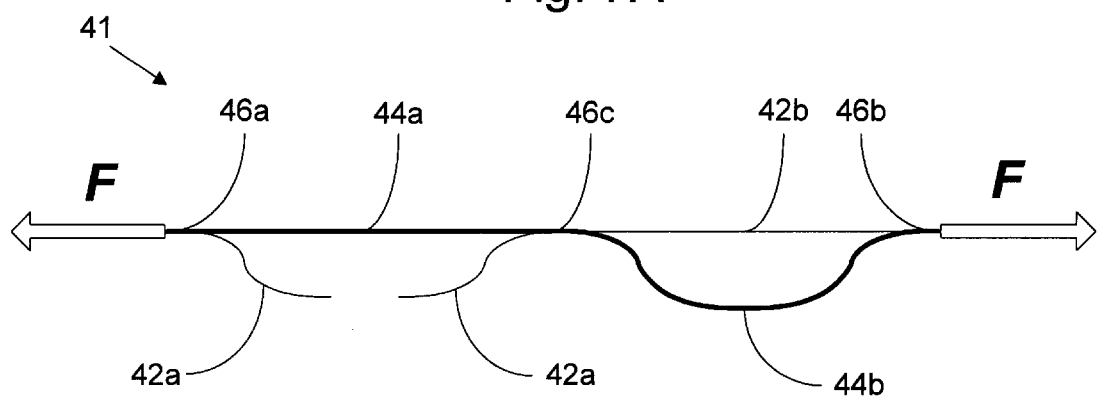
FIG. 7B is a diagram of the two-link composite member of FIG. 7A after failure of one of its first primary segments.

The initial response is identical to that of the single link member 40 shown in FIG. 6. That is, primary segments 42a and 42b will initially bear the load and, from the standpoint of an ideal model, should both fail simultaneously at a displacement of $\delta_{pf1}=l_p\epsilon_f^u$ and a deceleration force of $F_{pf}=A_p E_f \epsilon_f^u$, stated earlier as Equations 7 and 8. Nevertheless, small differences will always exist between primary segments 42a and 42b resulting in the failure of one of the two segments before the other. In the example shown in FIG. 7B, primary segment 42a fails first, after which secondary segment 44a and primary segment 42b will remain unloaded until a displacement of $\delta_{ps2}=(l_s-l_p)/2$ is reached. Based on Equation 6, it follows that $\delta_{ps2} > \delta_{pf1}$. Note that in this configuration, the strain energy stored in primary segment 42b during the initial stretching interval is released upon the failure of primary segment 42a. At that instant, the slack must be taken up in secondary segment 44a before primary segment 42b and secondary segment 44a once again come under load.

Figure 8:
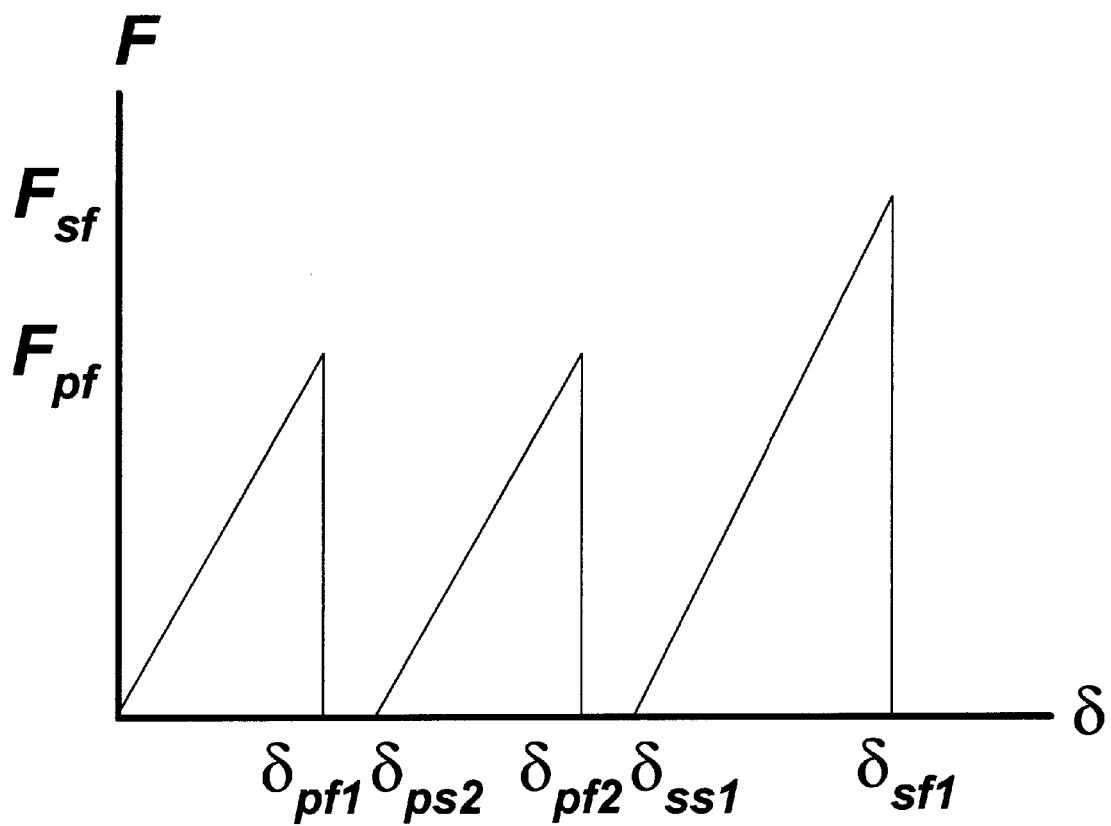
FIG. 8 is a graph of the deceleration versus distance response of the two-link composite member of FIGS. 7A–7C.

Composite member 41 once again begins to convert kinetic energy into strain energy, which is illustrated by the second triangle in FIG. 8. This time the energy is stored in the series combination of primary segment 42b and secondary segment 44a. Recall, however, the initial condition of Equation 5 that stated that the cross sectional area of secondary segment 44a is greater than that of primary segment 42b. Therefore, primary segment 42a has less tensile strength and will be the first to fail.

The failure of primary segment 42b will occur at a displacement $\delta_{pf2}$ given by Equation 11:

$$\delta_{pf2}=(l_s-l_p)/2+(l_s+l_p)\epsilon_f^u/2 \qquad (11)$$

The deceleration force at failure is identical to that for primary segment 42a.

Figure 7C:
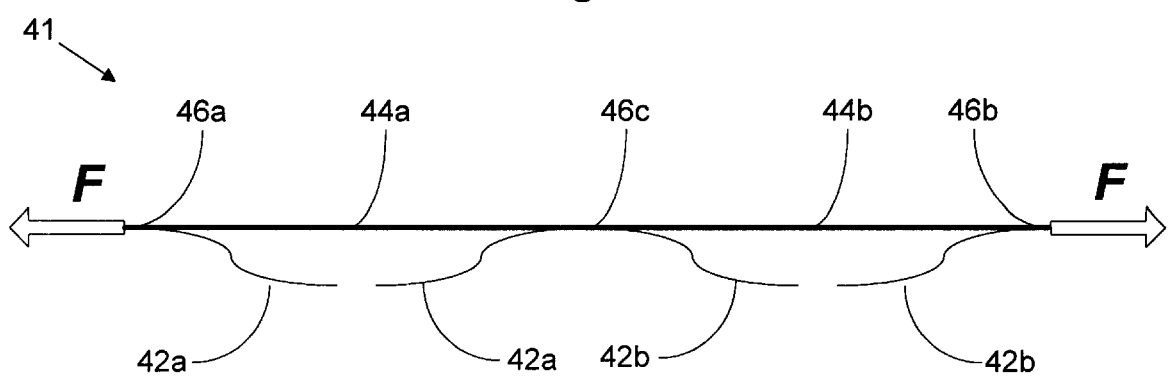
FIG. 7C is a diagram of the two-link composite member of FIG. 7A after failure of both of its primary segments.

After the failure of primary segment 42b, composite member 41 will once again remain unloaded until a displacement of $\delta_{ss1}=l_s=l_p$ is reached where both secondary segments 44a and 44b come under load as illustrated in FIG. 7C. The response of the series combination of secondary segments 44a and 44b follows the familiar, ramp function form until failure occurs at a displacement $\delta_{pf2}$ set forth in Equation 12:

$$\delta_{pf2}=(l_2-l_p)+l_s\epsilon_f^u \qquad (12)$$

At failure, secondary segments 44a and 44b exert a deceleration force of $F_{sf}=A_s E_f \epsilon_f^u$. And, because of Equation 5, $F_{sf} > F_{pf}$.

Compare now the response of two-link, composite member 41 depicted in FIG. 8, with the response of single link 40 depicted in FIG. 6. Recall that one deficiency pointed out in the performance of single link 40 is the lack of energy conversion between $\delta_{pf}$ and $\delta_{ss}$. It is easy to notice, however, that the performance of two-link member 41 and single link 40 are identical except for the middle triangle present in FIG. 8 that represents the effect of the additional node or connector 46c. Node or connector 46c is designed to connect and perform the load transfer between adjacent links (i.e., between segments on adjacent links). Connectors 46 can be implemented through various mechanisms such as welding, crimping, or gluing. Advantageously, the addition of node or connector 46c facilitates the conversion of energy between $\delta_{pf}$ and $\delta_{ss}$ that was heretofore unconverted by single link 40. In other words, more work is expended by an external body 20 (see FIG. 1) in failing two-link, composite member 41 of FIG. 7 than is required to fail single link 40 of FIG. 5.

Clearly a benefit is obtained through the addition of intermediate nodes to a single link system. The advantage is attributed to the load redistribution in the member that is accomplished via the redundant, parallel paths provided by the primary and secondary segments. Strain energy in the member is dissipated through a progressive, sequential failure of the primary segments while the structural integrity of the overall member is maintained. Once all of the primary segments have been compromised, the member follows the single fiber model until a failure occurs in a secondary segment or the maximum displacement or deceleration force is reached. As discussed hereinbefore, both the primary and secondary segments preferably comprise unidirectional, parallel fibers encased in an elastomeric matrix to ensure that the fibers maintain lateral flexibility in addition to their tensile stiffness. This flexibility is necessary to accommodate significant bending of the member when not subjected to stress. The secondary members are a good illustration of this effect as they must be sufficiently flexible to bend between the nodes or connectors joining them with their associated primary members.

The single and multi-link composite members described and illustrated herein are useful for illustrating the principles of the present invention; however, these principles can be extended beyond the one-dimensional, tether-type embodiments, shown. For example, multi-link composite members can be woven together to form a two-dimensional net or even a three-dimensional structure that will exhibit improved energy dissipating performance over a similar structure designed with single or bundled fiber members. Moreover, individual links can be designed to comprise multiple segments (i.e., more than a single primary and secondary pair) characterized by monotonically increasing length and strength. Thus, the segments comprising the individual links need not necessarily be made from the same material. In addition, the links do not necessarily require a gap between the individual segments. The space between the individual segments could be filled with a flexible matrix material if so desired.

Figure 9:
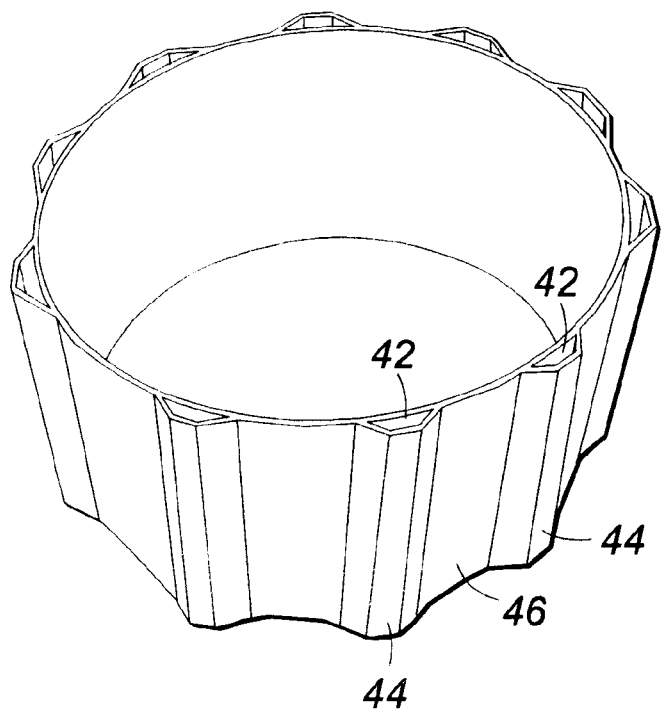
FIG. 9 is a perspective view of a structural member according to the present invention configured for dissipating energy emanating from a cylindrical body.

FIG. 9 presents one alternative embodiment of the present invention where the yield-type response is obtained in the hoop direction of a cylindrical reservoir. In this embodiment, when the cylinder is subject to a burst of internal pressure, the wall fails progressively, dissipating the energy of the burst while preserving the no-leak condition of the wall up to the stage where a secondary load path failure occurs, after all the primary load paths have failed.

Figure 10:
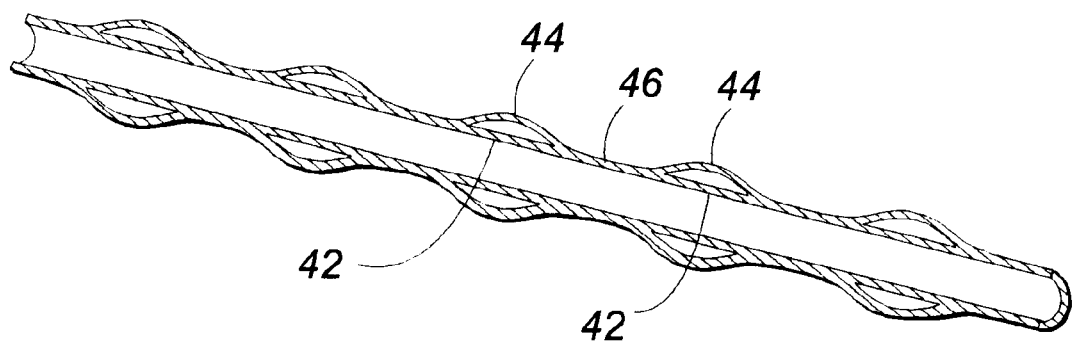
FIG. 10 is a perspective view of a structural member according to the present invention embodied in an axisymmetric configuration.

FIG. 10 illustrates another alternative embodiment in which the structural member is folded along an axis defining its length providing an elongated, axisymmetric configuration.

An analytical model can be developed describing the performance of both the single fiber or single length, bundled fiber structural members and the multi-link composite member discussed herein.

Turning first to the single fiber member, the force versus distance or displacement function can be expressed straightforwardly as Equation 13:

$$F(\delta)=(E_f \pi d_f^2/4l)[R(0,\delta)-R(\delta_{max},\delta)-\delta_{max}H(\delta_{max},\delta)] \qquad (13)$$

$$\delta_{max}=l\epsilon_f^u$$

$R(\alpha,\beta)$ represents a ramp function originating at $\alpha$ on the horizontal axis, $H(\alpha,\beta)$ represents a unit step function originating at α on the horizontal axis, l represents the member length and $d_f$ represents the fiber diameter. Equation 14 generates the single, triangle shaped curve such as exemplary curves 28, 30 and 32 of FIG. 2.

The multi-link embodiment is more complex. It is helpful to use a spring analogy and begin by generating stiffness constants for the primary and secondary segments that are similar to the spring constant used in modeling the behavior of a spring. The stiffness constants $k_p$ and $k_s$ for the primary and secondary segments are set forth in Equation 14:

$$k_p = E_f A_p / l_p \qquad (14)$$

$$k_s = E_f A_s / l_s$$

It is important to note that $l_p$ and $l_s$ refer to the lengths of a single primary and secondary segment respectively. The overall stiffness of the multi-link composite member is given by Equation 15 where n is the total number of links in which the member is subdivided and i is the number of links in which the primary segment has already failed:

$$K_i = k_p k_s / ((n-i)k_s + i k_p) \qquad (15)$$

Using these constructs, the force versus distance or displacement function can be expressed as Equation 16 where $\delta_i^s$, given by Equation 17, represents the displacement at which the member with i primary segments failed comes under load and where $\delta_i^u$, given by Equation 18, represents the displacement at which the $(i+1)^{st}$ primary segment fails:

$$F_i = \begin{cases} K_i(\delta - i(l_s - l_p)), & \text{if } \delta \in (\delta_i^s, \delta_i^u] \\ 0, & \text{otherwise} \end{cases} \qquad (16)$$

$$\delta_i^s = \begin{cases} 0, & i = 0 \\ \max[\delta_{i-1}^u, i(l_s - l_p)], & 0 < i \leq n \end{cases} \qquad (17)$$

$$\delta_i^u = \begin{cases} i(l_s - l_p) + \left[(n-i)l_p + i l_s \dfrac{A_p}{A_s}\right] \varepsilon_f^u, & i \neq n \\ n l_s \varepsilon_f^u, & i = n \end{cases} \qquad (18)$$

From Equations 14 through 18, the following four non-dimensional parameters can be derived that control the behavior of the multi-link composite member: $\alpha = A_s/A_p, \lambda = l_s/l_p, \varepsilon_f^u$ and n. By assigning representative values to each of these parameters, the force versus distance curve can be plotted using the foregoing equations.

Figure 11:
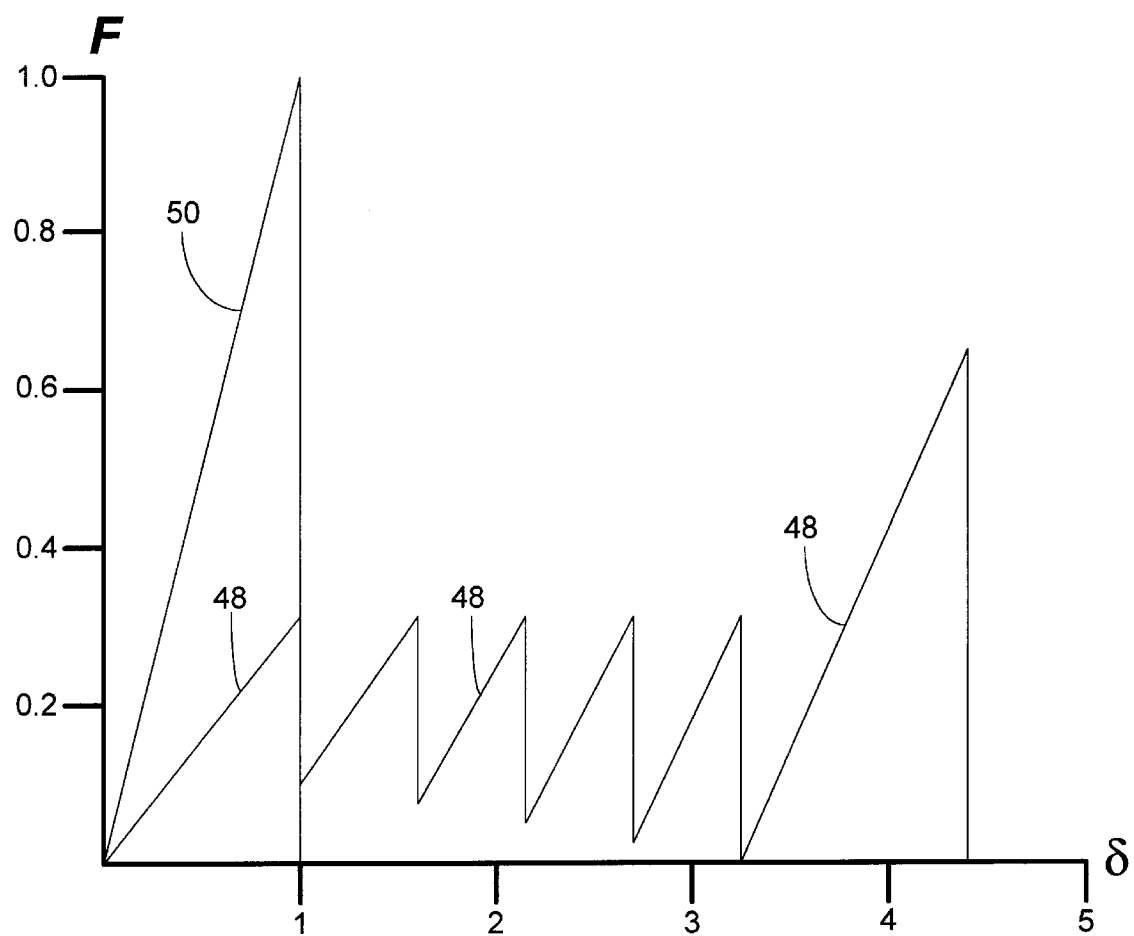
FIG. 11 is a graph of the deceleration versus distance response of a five-link composite embodiment of the structural member of FIG. 1.

FIG. 11 illustrates the response of a five-link composite member having the following parameters: α=2.0, λ=1.1, $\varepsilon_f^u$=0.03 and n=5. Curve 48 follows the familiar form discussed earlier with respect to FIGS. 6 and 8. That is, curve 48 comprises five small triangles, corresponding to the failure of the five primary segments, followed by a larger triangle representative of the failure of one of the secondary segments. A second curve 50 is overlaid on the graph of FIG. 11 that is representative of the single fiber model where the fiber length l=$nl_p$. Again, the energy dissipated by the two members can be determined by calculating the area under both curves. The result of such a comparison reveals that the five-link member dissipates 2.02 times more energy than the single fiber member. Moreover, it should also be noted that the five-link member achieves this advantage while applying a consistently lower deceleration force.

Figure 12:
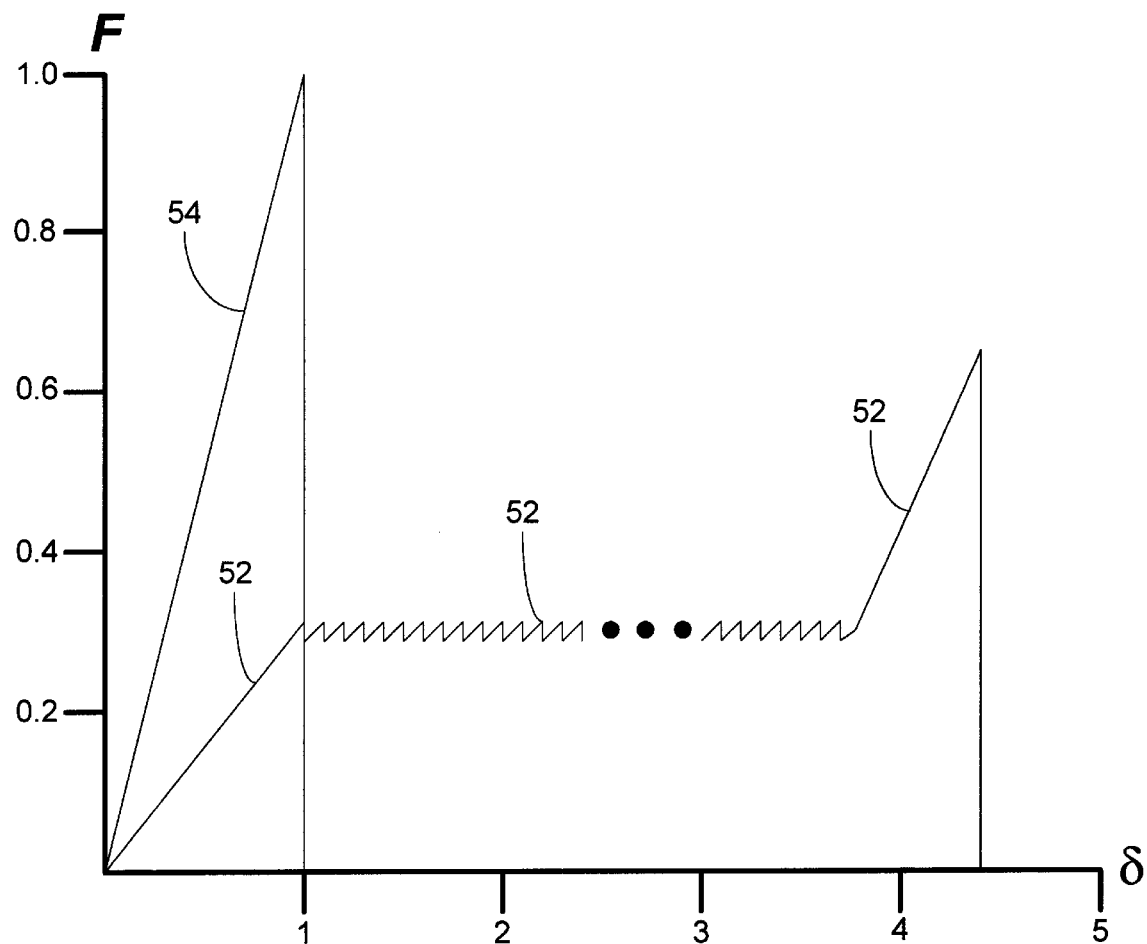
FIG. 12 is a graph of the deceleration versus distance response of a fifty-link composite embodiment of the structural member of FIG. 1.

FIG. 12 extends this illustration to a fifty-link composite member having the same parameters as listed above. It is interesting to note the almost flat response of the fifty-link member as depicted by curve 52. This flat response is a result of the short displacement required to eliminate any slack between failures of the primary segments. The end peak, once again, corresponds to the failure of one of the secondary segments. The energy dissipated by the fifty-link member is 2.73 times the energy dissipated by the single fiber member represented by curve 54 while still maintaining a significantly lower level of deceleration force.

Figure 13:
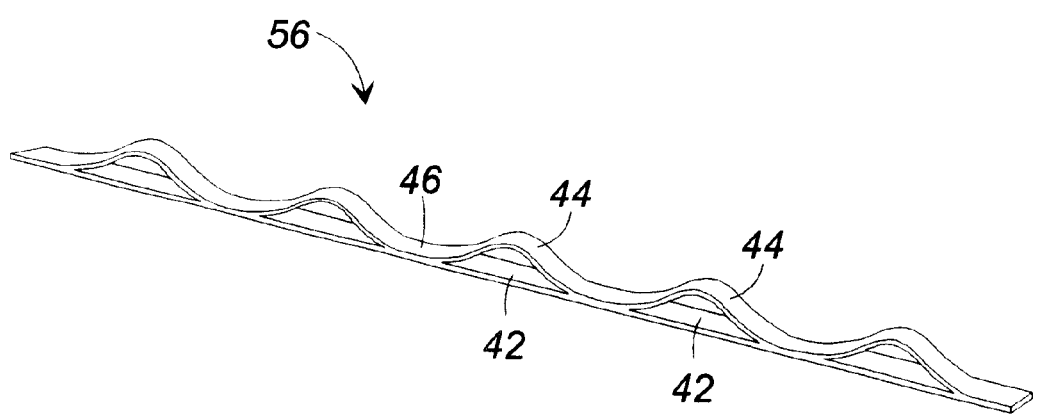
FIG. 13 is a perspective view of the five-link composite member of FIG. 11 constructed from fiber reinforced strapping tape.

While the models derived in Equations 13 through 18 and illustrated in FIGS. 11 and 12 are theoretical and represent an ideal system, their accuracy has been verified through experimental testing. For example, FIG. 13 depicts a five-link composite member 56 made from commercially available, fiber reinforced strapping tape. Five-link member 56 was then stretched using a hydraulic testing machine during which force and displacement data were collected. When plotted, the data conformed with the six peak curve 48 shown in FIG. 11 thereby verifying the accuracy of the models.

The present invention has been described and illustrated herein through the use of graphs and analytical models. It will be appreciated by those skilled in the art that a multi-link structural member can be constructed that offers significant improvements in energy dissipation over alternative, single or bundled fiber constructions. It is envisioned that these multi-link members will find uses in a variety of applications. Examples, include, but are not limited to; crashworthy, stroking seats for helicopters; yielding seat belts for automotive applications; emergency escape from tall buildings, in the form of a limited deceleration, no spring-back bungee cord; emergency airplane/vehicle arrest mechanisms; fast airdrop of equipment from helicopters; and a fall-tolerant mountain climbing rope.

The concepts and teachings disclosed herein are discussed further in the following references, each of which is incorporated by reference: 1) Dancila, D. S., "Energy Dissipating Tensile Composite Members with Progressive Failure," Ph.D. Thesis, School of Aerospace Engineering, Georgia Institute of Technology, Atlanta, Ga., March 1998; and 2) Dancila, D. S. and Armanios, E. A., "Energy-Dissipating Composite Members with Progressive Failure," submitted for publication in the Proceedings of the 39$^{th}$ AIAA/ASME/ASCE/AHS/ASC Structures, Structural Dynamics, and Materials Conference and Exhibit, Long Beach, Calif., Apr. 20–23, 1998.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A tailored structural member for dissipating kinetic energy, comprising:

a plurality of links;

each said link comprising a plurality of parallel segments, each of said segments demonstrating axial tensile stiffness, said segments defining redundant load paths through said structural member; and said links being connected by at least one node that performs load transfer between said segments on adjacent said links.

2. The tailored structural member of claim 1, wherein said segments comprise unidirectional composite fibers embedded in an elastomeric matrix.

3. The tailored structural member of claim 2, wherein said composite fibers are selected from the group consisting of PBO fibers, KEVLAR fibers, carbon fibers, and glass fibers.

4. The tailored structural member of claim 2, wherein said elastomeric matrix is a rubber compound.

5. The tailored structural member of claim 1, wherein said segments are generally flexible in directions lateral to an axis defined by said segments.

6. A tailored structural member for dissipating kinetic energy, comprising:
- a plurality of links, each said link comprising a primary segment having a length, a first end and a second end, said first end connected to a first node and said second end connected to a second node and a secondary segment having a length, a first end and a second end, said first end connected to said first node and said second end connected to said second node, said secondary segment length being longer than said primary segment length;
- for each said link, said primary segment having a failure threshold at a first displacement of said first node from said second node and said secondary segment having a failure threshold at a second displacement of said first node from said second node, said second displacement being greater than said first displacement; and
- each said primary segment demonstrating axial stiffness and having a tensile strength and each said secondary segment demonstrating axial stiffness and having a tensile strength, each said tensile strength of said secondary segments being greater than each said tensile strength of said primary segments such that every one of said primary segments succumbs to failure as a result of node displacement before a single one of said secondary segments succumbs to failure.

7. The tailored structural member of claim 6, wherein said primary and secondary segments comprise substantially similar materials, said primary segment having a cross sectional area $A_p$ and said secondary segment having a cross sectional area $A_s$ such that $A_p < A_s$ and wherein said composite member generates a deceleration force $F_{pf}$ at the instance of one of said primary segment failures and said composite member generates a deceleration force $F_{sf}$ at the instance of one of said secondary segment failures such that $F_{sf} < F_{pf}$.

8. The tailored structural member of claim 6, wherein said primary and secondary segments comprise a plurality of unidirectional composite fibers embedded in an elastomeric matrix.

9. The tailored structural member of claim 8, wherein said primary and secondary segments are generally flexible in directions lateral to an axis defined by said elongated fibers.

10. The tailored structural member of claim 8, wherein said composite fibers are selected from the group consisting of PBO fibers, KEVLAR fibers, carbon fibers, and glass fibers.

11. The tailored structural member of claim 8, wherein said elastomeric matrix is a rubber compound.

12. The tailored structural member of claim 6, wherein said structural member has an ideal deceleration force ($F_i$) versus displacement ($\delta_i$) response given by the following equations:

$$F_i = \begin{cases} K_i(\delta - i(l_s - l_p)), & \text{if } \delta \in (\delta_i^s, \delta_i^u] \\ 0, & \text{otherwise} \end{cases}$$

$$\delta_i^s = \begin{cases} 0, & i = 0 \\ \max[\delta_{i-1}^u, i(l_s - l_p)], & 0 < i \leq n \end{cases}$$

$$\delta_i^u = \begin{cases} i(l_s - l_p) + \left[(n-i)l_p + il_s \dfrac{A_p}{A_s}\right]\varepsilon_f^u, & i \neq n \\ nl_s\varepsilon_f^u, & i = n \end{cases}$$

where:
- n is a total number of said links comprising said composite member;
- i is a number of links in which said primary segment has failed;
- $\delta_i^s$ is a displacement at which said member having i primary links failed comes under load;
- $\delta_i^u$ is a displacement at which an $(i+1)^{st}$ primary segment fails;
- $\varepsilon_u^f$ is an elongation factor used to obtain a length of a segment at an instant of failure;

$K_i = k_p k_s ((n-i)k_s + ik_p)$;

$k_p = E_p A_p / l_p$;

$K_s = E_s A_s l / l_s$;

$E_p$ is an elastic modulus of said primary segments;

$E_s$ is an elastic modulus of said secondary segments;

$A_p$ is a cross sectional area of one of said primary segments;

$A_s$ is a cross sectional area of one of said secondary segments;

$l_p$ is a length of one of said primary segments; and $l_s$ is a length of one of said secondary segments.

13. A process for dissipating kinetic energy, comprising the steps of:
- providing a tailored structural member comprising a plurality of links, each said link comprising a primary segment and a secondary segment;
- converting kinetic energy from said moving body into strain energy in said primary segments;
- dissipating said strain energy in said primary segments through sequential failure of said primary segments;
- converting kinetic energy from said moving body into strain energy in said secondary segments; and
- dissipating said strain energy in one of said secondary segments through failure of said secondary segment after said failure of all of said primary segments.

14. The process of claim 13, wherein said primary and secondary segments comprise a plurality of unidirectional composite fibers embedded in an elastomeric matrix.

15. The process of claim 14, wherein said primary and secondary segments are generally stiff along an axis defined by said composite fibers and are generally flexible in directions lateral to said axis.

16. A tailored structural member, said member comprising:
- a plurality of links, said links having at least one node and wherein said links are connected in series at said nodes;
- each of said links comprising two or more axially stiff segments, said segments connected at said nodes in a parallel configuration, said segments forming redundant load paths in the structural member; and
- each of said segments having a certain length and a certain strength, wherein said lengths are selected such that, subject to stretching, the order of failure of the segments is the same as the order of strength.

* * * * *